United States Patent [19]
Montgelard

[11] Patent Number: 6,000,100
[45] Date of Patent: Dec. 14, 1999

[54] REMOVABLE CONTAINER HOLDING DEVICE

[75] Inventor: Michel Montgelard, Cran Gevrier, France

[73] Assignee: SEB S.A., France

[21] Appl. No.: 09/157,133

[22] Filed: Sep. 18, 1998

[30] Foreign Application Priority Data

Oct. 1, 1997 [FR] France ................................. 97 12224

[51] Int. Cl.⁶ ................................................. A47B 95/02
[52] U.S. Cl. ........................... 16/425; 220/759; 220/768; 220/769
[58] Field of Search ..................... 220/759, 768, 220/769; 16/425, 422, DIG. 40, DIG. 41

[56] References Cited

U.S. PATENT DOCUMENTS

| | | | |
|---|---|---|---|
| 1,453,543 | 5/1923 | Bonser | 16/110 A |
| 1,635,119 | 7/1927 | Dziuba et al. | |
| 2,137,180 | 11/1938 | Porro | 16/110 A |
| 2,808,284 | 10/1957 | Rasmussen | 16/110 A |
| 3,232,657 | 2/1966 | Thompson et al. | 220/759 |
| 5,704,092 | 1/1998 | Nicollet et al. | 16/110 A |

FOREIGN PATENT DOCUMENTS

| | | |
|---|---|---|
| 2207672 | 6/1974 | France . |
| 2739772 | 4/1997 | France . |

Primary Examiner—Chuck Y. Mah
Attorney, Agent, or Firm—Bachman & LaPointe, P.C.

[57] ABSTRACT

A removable holding device for containers includes two clamp members mounted on a holding body, one of the members being mobile in translation relative to the holding body. A lever mounted on the holding body pivots between a deployed position and a position retracted inside the holding body. A link blade between the lever and the mobile member displaces the mobile member in translation when the lever pivots. The lever has at least one lateral wing portion forming an unlocking button projecting on one side of the holding body when the lever is in the retracted position.

6 Claims, 2 Drawing Sheets

REMOVABLE CONTAINER HOLDING DEVICE

BACKGROUND OF THE INVENTION

1. Field of the Invention

The present invention concerns a removable container holding device, and in particular one for culinary utensils.

2. Description of the Prior Art

Saucepans and casserole dishes with removable handles are known in themselves. One such removable holding device is described in French patent application FR 2 739 772.

It is designed for a container, in particular a culinary utensil, having a lateral wall or skirt with a curved rim.

The holding device comprises two clamp members mounted on a holding body and having one end with a shape complementary to the inside surface and the outside surface of a part of the skirt and of the curved rim of the container, respectively, and displacement means adapted to displace these members relative to each other between an open position and a closed position in which the ends of the members grip the skirt of the container. One of the members moves in translation relative to the holding body, the displacement means comprising a lever mounted on the holding body to pivot between a deployed position and a position retracted inside the holding body and a link blade extends between the lever and the mobile member and is adapted to displace the mobile member in translation when the lever pivots.

The above device includes locking means adapted to hold the members in the closed position relative to each other.

An unlocking button is provided on the pivoted lever. The holding body incorporates a recess. In the closed position the unlocking button is accommodated in this recess and passes through the holding body.

The user depresses the button with one finger to unlock the holding device.

To unlock the device it is therefore necessary to depress the unlocking button and to let go of the holding body of the device to enable the lever to pivot out of the holding body.

However, when the button is depressed with the thumb, the other fingers of the same hand are under the holding body and prevent the lever pivoting unless the user releases the pressure applied by the fingers to the holding body.

This manipulation is not always obvious to all users.

Furthermore, in the above prior art device, the unlocking button is fixed to the lever near its pivot axis and consequently a strong force is required to displace the lever.

An aim of the present invention is to remedy the above drawbacks and to propose a removable holding device that is simpler to unlock.

SUMMARY OF THE INVENTION

The invention consists in a removable holding device for containers, in particular for culinary utensils, including two clamp members mounted on a holding body and adapted to grip a rim of a container, and displacement means adapted to displace the members relative to each other between an open position and a closed position in which the members grip the rim of the container, one of the members being mobile in translation relative to the holding member and the displacement means comprising a lever mounted on the holding body to pivot between a deployed position and a position retracted inside the holding body, a link blade extending between the lever and the mobile member being adapted to displace the mobile member in translation when the lever pivots, wherein the lever has at least one lateral wing portion forming an unlocking button and adapted to form a projection on one side of the holding body when the lever is in said retracted position.

The holding device of the invention enables the user to open the clamp closed onto the rim of the container more easily.

Because the unlocking button has been moved to one side of the holding body, the user must pivot their hand around the holding body in order to be able to depress the button with one finger, with the result that the fingers are on the sides of the holding body and not opposite the lever.

In an advantageous version of the invention, the lever has two lateral wing portions symmetrically disposed with respect to a longitudinal axis of the lever and adapted to form a projection on respective sides of the holding body.

This enables the user to operate the unlocking button with the fingers of a hand on both sides of the holding body, for example with the thumb or the index finger.

What is more, unlocking being more natural and easier with the thumb, the two wing portions of the lever enable the holding device to be opened equally easily with the left hand or the right,hand.

The lateral wing portion preferably extends over the lever substantially facing,a pivot of the link blade in the lever.

This facilitates unlocking the holding device by pivoting the lever through application of a force to the lever at the pivot of the link blade.

In a preferred version of the invention, said lateral wing portion is near a first end of the lever opposite a second end of the lever mounted to pivot on the holding body.

This structure offers a long lever arm for unlocking, by disposing the unlocking button near the free end of the lever pivoting on the holding body.

Other features and advantages of the invention will become apparent in the following description.

BRIEF DESCRIPTION OF THE DRAWINGS

In the appended drawings, given by way of non-limiting example.

DETAILED DESCRIPTION OF THE PREFERRED EMBODIMENT

The removable holding device of the invention is designed for a culinary utensil such as a saucepan or a casserole dish.

Figure 1:
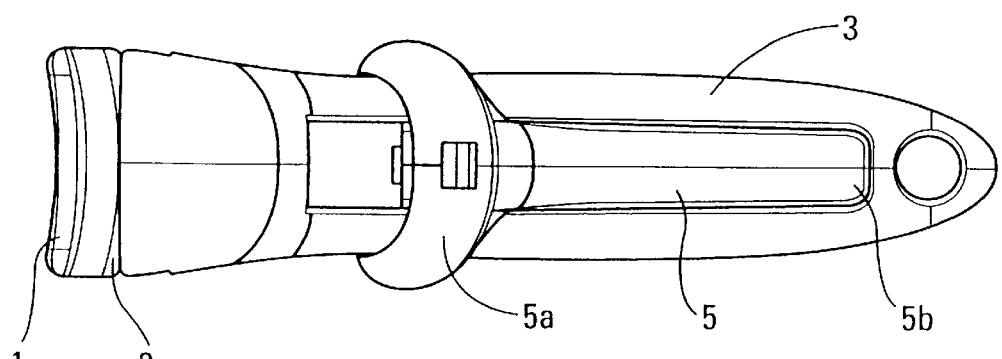
FIG. 1 is a bottom view of the holding device of the invention in an open position.
Figure 3:
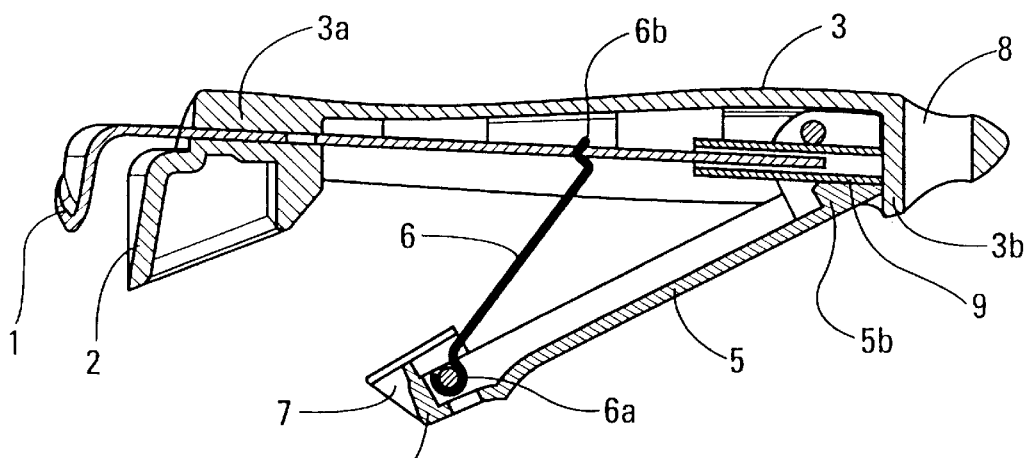
FIG. 3 is a view in section taken along the line III—III FIG. 2.
Figure 2:
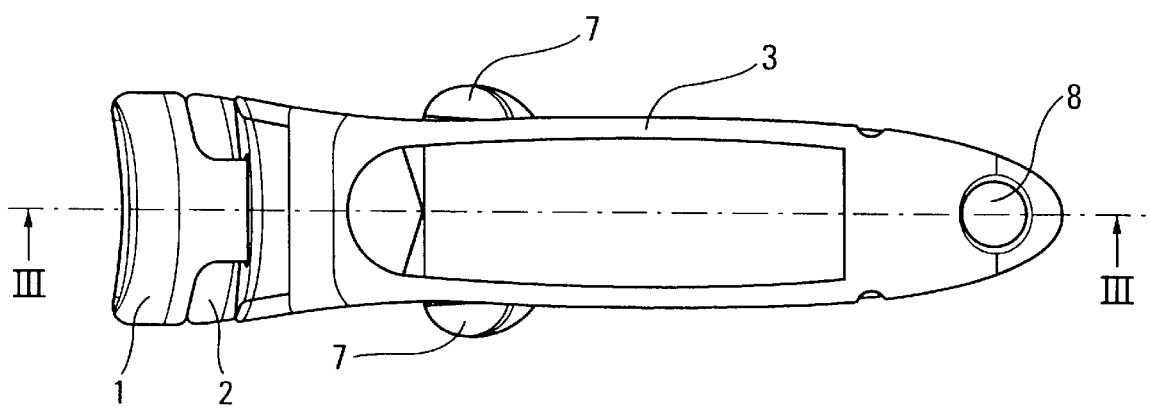
FIG. 2 is a top view of the device from FIG. 1 in the open position.
Figure 4:
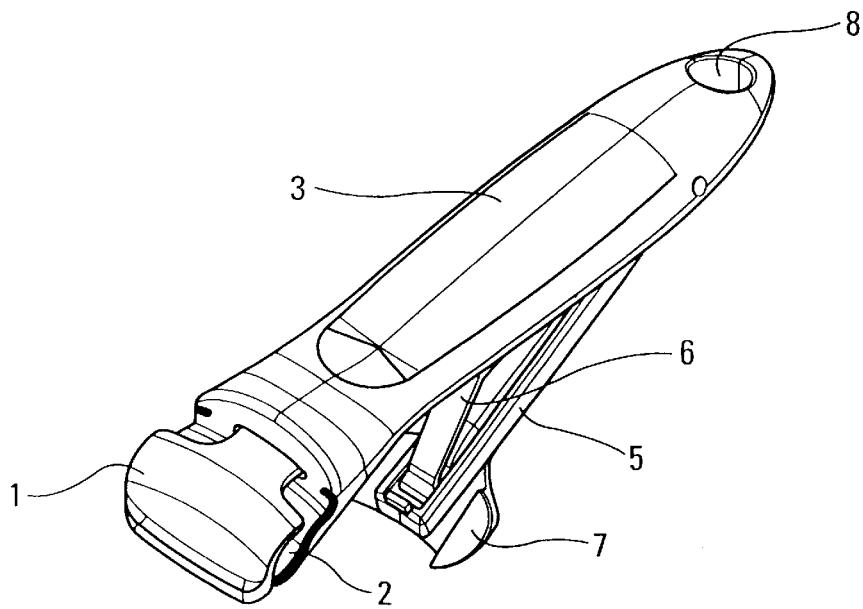
FIG. 4 is a perspective view of the device of the invention in the open position.
Figure 6:
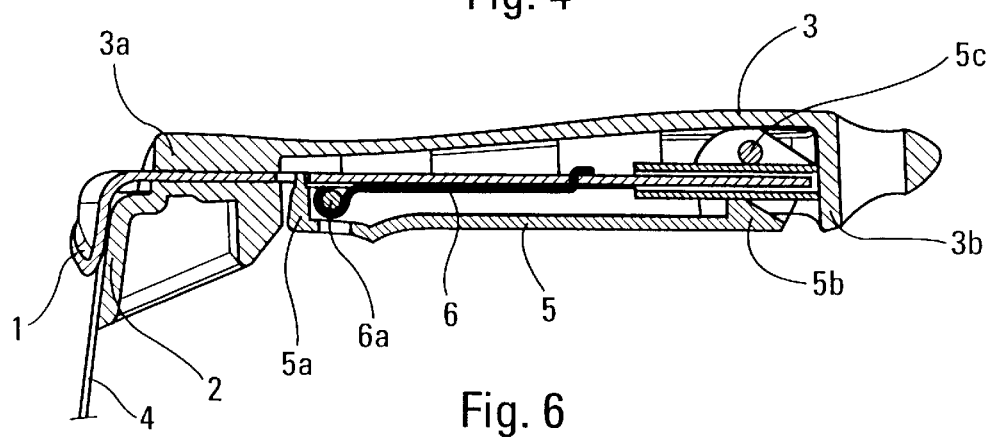
FIG. 6 is a view in section taken along the line VI—VI in FIG. 5.

As shown in FIG. 3, it,includes two clamp members 1, 2 mounted on a holding body 3 and adapted to grip a rim 4 of the container (see FIG. 6).

One member 1 is mobile in translation relative to the holding body 3 and the other member 2 of the clamp is fixed relative to the holding body 3. In this example the other member 2 is formed by one end 3a of the holding body 3.

In this example the members 1 and 2 each have an end which has a shape complementary to that of the inside or outside surface of the rim of the skirt of the container. The rim 4 is curved to form a pouring spout.

The holding body 3 is in the form of a saucepan handle with an opening 8 at its free end 3b enabling the device to be hung from a hook.

Displacement means 5, 6 are adapted to displace the member 1 relative to the member 2 between an open position shown in FIG. 3 and a closed position shown in FIG. 6 in which the ends of the members 1, 2 grip the rim 4 of the container 1.

The displacement means comprise a lever 5 mounted on the holding body 3 to pivot between a deployed position and a position retracted inside the holding body 3.

The latter therefore incorporates a housing adapted to receive the lever in the retracted position, corresponding to the closed position of the clamp members 1 and 2.

Accordingly, when the holding device is fixed to the container it has substantially the same exterior shape as a conventional saucepan handle.

The lever 12 pivots about a pin 5c fixed to the holding body 3.

A link blade 6 extends between the lever 5 and the mobile member 1 and is adapted to displace the mobile member 1 in translation when the lever 5 pivots.

The link blade 6 pivots on a pin 6a attached to the lever 5 and its other end 6b is fixed to the mobile member 1.

The latter is in the form of an elongate plate one end of which is curved to grip the rim 4 of the container. This end of the member 1 projects out of the holding body 3 opposite the fixed second member 2 of the clamp.

The other end of the elongate plate forming the mobile member 1 is preferably guided in translation inside the holding body 3 by a guide passage or rail 9.

Accordingly, when the lever 5 pivots about its pin 5c attached to the holding body 3 the end 6a of the link 6 inserted in the lever 5 also pivots so that at the end of the travel of the lever the link 6 is aligned with the translation axis of the member 1, i.e. the longitudinal axis X of the holding body 3.

The link blade 6 is designed to be sufficiently elastic to be slightly compressed when the device is closed to adjust the distance between the two members 1 and 2 to compensate for different diameter and different thickness culinary items.

The blade 6 therefore has a slightly curved profile between its two ends respectively mounted on the mobile member 1 and the lever 5, the radius of curvature of this profile being slightly reduced when the blade 6 is compressed.

In the closed position of the device the link blade 6 extends in a direction parallel to the translation axis X of the mobile member 1, i.e. perpendicular to a skirt portion of the retainer 1 receiving the device, and is adapted to apply a force to the end of the mobile member 1 and to apply a force in the opposite direction to the end of the other member 2.

This link blade is described in patent application FR 2 739 772 the content of which is hereby incorporated by reference.

Figure 5:
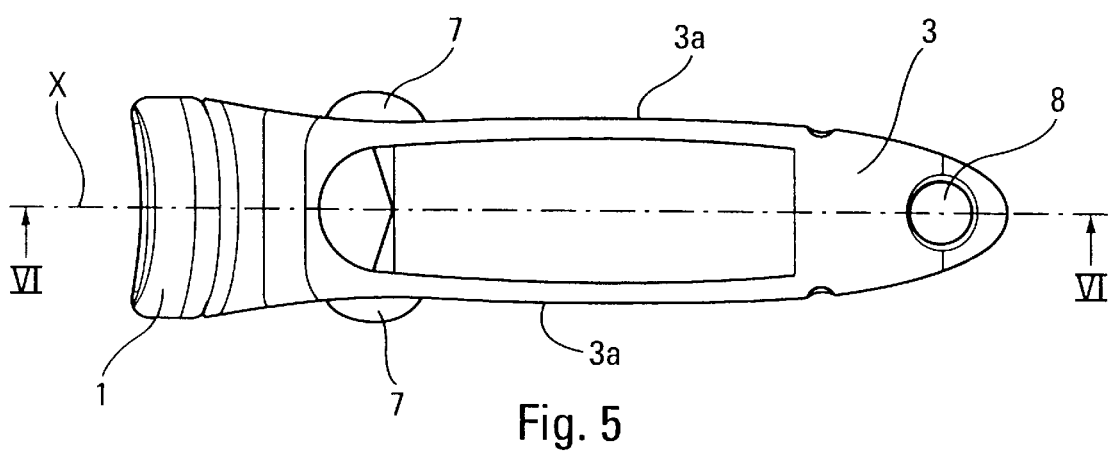
FIG. 5 is a top view of the device from FIG. 1 in a closed position.

In accordance with the invention, the lever has at least one lateral wing portion 7 forming an unlocking button and adapted to form a projection on one side 3a of the holding body 3 when the lever 5 is in its retracted position, as shown in FIG. 5.

In this example the lever 5 has two lateral wing portions symmetrically disposed relative to a longitudinal axis of the lever and adapted to form a respective projection on each side of the holding body.

Here these two wing portions 7 are two ends of a semi-circular annular part 5a forming the free end of a lever 5.

This free end 5a of the lever therefore espouses a section of the bottom part and the sides 3a of the holding body 3 in the closed position of the device.

References in this description to the upper and lower parts of the holding body 3 assume the holding device fixed to a container.

The two lateral wing portions 7 form on either side of the holding body 3 a projection 7 with a plane surface oriented towards the top part of the holding body 3.

These plane surfaces therefore constitute the unlocking button of the device.

The lateral wing portions 7 and the annular part 5a extend over the lever 5 substantially facing the pivot 6a of the link blade 6 in the lever 5.

The lateral wing portions 7 are also near the end 5a of the lever 5 opposite the second end 5b of the lever 5 mounted to pivot about the pin 5c on the holding body 3.

The second end 5b of the lever 5 is fixed near the free end 3b of the holding body 3 opposite the clamp members 1, 2 and the lever 5 is fixed to the bottom of the holding body 3.

In use, the holding device in the open position is positioned on the rim of the container, in theory the user holding the handle with the thumb on the top part of the holding body 3 and the other fingers under the holding body 3.

By closing their hand, the user causes the lever 5 to pivot until the lever 5 is accommodated in the holding body 3.

The link blade 6 is then parallel to the mobile member 1, at the end of its pivoting travel, and the device is therefore locked by the return force of the elastic link blade 6 which applies a force both to the mobile member 1, at the end 6b of the blade 6, and to the holding body 3, through the intermediary of the lever 5, at the end 6a of the blade 6.

To unlock the holding device the user merely has to depress one or both unlocking buttons 7 to dislodge the lever 5 from the holding body 3 and so move the mobile member 1 away from the fixed member 2 of the clamp.

Of course, many modifications can be made to the example described above without departing from the scope of the invention.

Accordingly, the link blade 6 sufficiently elastic to adjust the distance between the clamp members 1, 2 can be replaced by a link blade associated with a compensator spring, as described in patent application FR 2 739 772, for example.

There is claimed:

1. A removable holding device for containers, in particular for culinary utensils, including two clamp members mounted on a holding body and adapted to grip a rim of a container, and displacement means adapted to displace said members relative to each other between an open position and a closed position in which said members grip said rim of said container, one of said members being mobile in translation relative to said holding body and said displacement means comprising a lever mounted on said holding body to pivot between a deployed position and a position retracted inside said holding body, a link blade extending between said lever and said one member to displace said one member in translation when said lever pivots, wherein said lever has at least one lateral wing portion forming an unlocking button and at least one projection on at least one side of said holding body when said lever is in said retracted position.

2. The holding device claimed in claim 1 wherein said lever has two lateral wing portions symmetrically disposed with respect to a longitudinal axis of said lever and adapted to form a projection on respective sides of said holding body.

3. The holding device claimed in claim 1 wherein said link blade pivots about a pivot in said lever and said at least one lateral wing portion extends over said lever and substantially faces said pivot.

4. The holding device claimed in claim 1 wherein said at least one lateral wing portion is near a first end of said lever opposite a second end of said lever mounted to a pivot on said holding body.

5. The holding device claimed in claim 4 wherein said second end of said lever is fixed near a free end of said holding body and said free end is opposite said clamp members.

6. The holding device claimed in claim 1 wherein said lever is fixedly positioned relative to the bottom of said holding body.

* * * * *